United States Patent Office 3,752,798
Patented Aug. 14, 1973

3,752,798
TRIS-$N^{A_1},N^{B_1},N^{\epsilon B_{29}}$ - (3-X-3-OXO - 1-Y-PROP-1-EN-1-YL)[$N\delta$-(4-Z-6-R-PYRIMIDIN - 2 - YL) ORNITHINE $B_{22}$]-INSULINS AND THEIR PREPARATION
Gaston Amird, 27 Rue du Marechal Joffre, 77 Thorigny, France, and Truong van Thuong, 1 Allee la Bruyere, Domaine de la Lorette, 93 Clichy-sous-Bois, France
No Drawing. Filed Dec. 2, 1969, Ser. No. 881,602
Int. Cl. C07c 103/52
U.S. Cl. 260—112.7    9 Claims

ABSTRACT OF THE DISCLOSURE

Tris - $N^{A_1},N^{B_1},N^{\epsilon B_{29}}$ - (3 - X - 3 - oxo - 1 - Y - prop-1 - en - 1 - yl)[$N\delta$ - (4-Z-6-R-pyrimidin-2-yl) ornithine $B_{22}$]-insulins and their water soluble alkali metal salts existing in substantially dissociated state having delayed action hypoglycemiant and their preparation.

---

The invention has more precisely as object the salts which are formed with bases by tris-$N^{A_1},N^{B_1},N^{\epsilon B_{29}}$-(X-3 oxo-3 Y-1 propene-1 yl-1)[$N\delta$-(Z-4 R-6 pyrimidinyl-2) ornithine $B_{22}$] -insulins, these salts existing in the dissociated or slightly associated state comparable to that of insulin, being soluble in water, and having the basic molecular pattern with the schematic General Formula I:

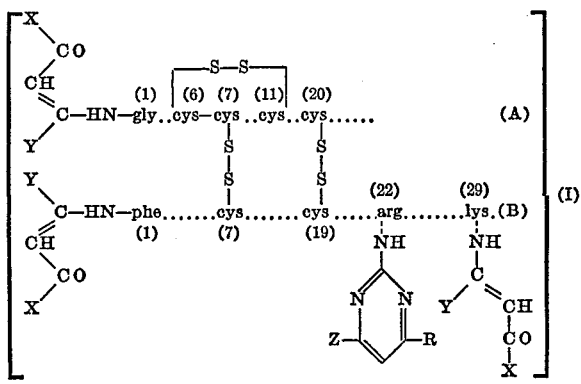

in which X and Y, identical or different, represent, an alkyl, aralkyl or aryl radical, these radicals being able possibly to be substituted, or else X and Y together represent a possibly substituted polymethylene grouping, Z and R, identical or different, represent an alkyl, aralkyl or aryl radical, these radicals being able possibly to be substituted, as well as the non-salified tris-$N^{A_1},N^{B_1},N^{\epsilon B_{29}}$-(X-3 oxo-3 Y-1 propene-1 yl-1) [$N\delta$-(Z-4 R-6 pyrimidinyl-2) ornithine $B_{22}$]-insulins in the free state, existing in the dissociated or slightly associated form.

The substituents X and Y, R and Z possess preferably the following meanings: X, Y, R and Z represent an alkyl radical comprising 1 to 6 carbon atoms such as methyl, ethyl, propyl, isopropyl, butyl, sec-butyl, t-butyl, these radicals being able to be substituted or not; an aralkyl radical comprising 7 to 10 carbon atoms such as benzyl, phenylethyl, phenyl-3 propyl, etc. these radicals being able to be substituted or not; a monocyclic aryl radical, such as a phenyl radical possibly substituted specifically by one or several methyl, ethyl, propyl or isopropyl radicals, by one or several methoxy, ethoxy, propoxy, isopropoxy radicals, by one or several halogen atoms, by one or several trihalogenomethyl groupings, etc.; X and Y being moreover able to represent together a possibly substituted polymethylene grouping such as dimethylene or trimethylene.

The "bases" are chosen from the group consisting of the mineral bases such as alkali-metal bases like potassium hydroxide, sodium hydroxide and lithium hydroxide, or ammonium hydroxide, and the organic bases such as pyridine, piperidine or morpholine.

The said salts, I, and the corresponding free proteins are endowed with remarkable physiological properties. They exert specifically, on animals and man, a delayed hypoglycemiant action which is manifested by a reduction of glycemia which is slightly more delayed but far more prolonged than that which one observes with insulin, even by intravenous injection. These compounds likewise display a marked anabolizing activity. With the salts of the invention, one thus has available for the first time delayed-action hypoglycemiant compounds, which, unlike the products at present available commercially, are very soluble in water which considerably facilitates their therapeutic use.

The present compounds, the object of the invention, have the advantage over insulin of producing a progressive reduction of glycemia to no more than between 30 and 50% of the starting value. Hence the risk of coma by hypoglycemia does not exist. Moreover, the return to the starting glycemia likewise takes place in a progressive manner without resulting in an increase over the initial value.

The present salts, the object of the invention, have, in relation to injectable suspensions of delayed-action insulin derivatives, the advantage of being neutral, perfectly soluble and of containing only very slight quantities of zinc. Therefore one can thus administer for prolonged periods solutions of these compounds without the risk of necrosis or of sclerification at the injection point.

One can conclude that the compounds of the present invention act as efficacious hydroglycemiants with a progressive action almost as rapid as that of insulin after administration by intravenous route, or with a very progressive action with considerable attenuation of the hypoglycemia peak after administration by intramuscular or sub-cutaneous route.

The compounds of the invention can be used for the treatment of diabetes and its complications, diabetic coma, diabetic or non-diabetic acidosis and emaciation.

They can likewise be used for the treatment of metabolic disorders connected with a disturbance of the glucido-lipidic catabolism by improving the ability of the organism to reduce the glucides more completely. Better nutrition and better assimilation of glucides and consequently of lipides result therefrom.

The compounds of the invention are used by intravenous, intramuscular and subcutaneous route.

They can take the form of injectable solutions, dispensed in ampoules, multi-dose flasks, sterile powders to be dissolved at the moment of use in an appropriate solvent.

The useful dose is a function of the route of administration. It is of the same order as that of natural insulin. The preferred dose varies between 0.1 and 0.5 u./kg. per day in the adult.

The pharmaceutical forms such as: injectable solutions and sterile powders are prepared according to the usual processes.

The nomenclature of the polypeptide compounds which is adopted here and in that which follows, is in conformity with the general principles of the nomenclature of polypeptides (cf. J. Biol. Chem., 241, 2491 (1966); Biochim. Biophys. Acta. 121, 1 (1966)) and with the rules decreed, by way of experiment, by the I.U.P.A.C. (cf. Biochemistry, vol. 6, No. 1, 362 (1967)) concerning the synthetic modifications of natural peptides.

The salts, I, as well as the corresponding free proteins, the object of the invention, differ from the compounds described in English Pat. No. 1,157,528 in that the blocking of the amino groups is total whereas the blocking of the amino groups of the compounds of the English Pat. No. 1,157,528 is only partial, and in that, unlike the compounds of the aforementioned patent, which exist in the form of strongly associated molecular aggregates, the salts, I, and the corresponding free proteins exist in the dissociated or slightly associated state, like that of natural insulin.

The salts, I, and the corresponding free proteins, being slightly associated, differ from the strongly associated compounds of the above-mentioned English patent by the characteristics stated hereafter which are the consequence of their slight degree of association.

The salts, I, and the corresponding free proteins have in their curve of circular dichroism a negative maximum of about 220 m$\mu$ which is linked to the partial helicoidal configuration of the chain B of the insulinoid molecule and which does not exist in the strongly associated compounds of the English Pat. No. 1,157,528. The salts, I, and the corresponding free proteins in general like insulin display a considerable mobility in chromatography on paper while under the same conditions the $R_f$ of the compounds of English Pat. No. 1,157,528 is nil. Finally, the salts, I, possess a strong solubility in water which does not exist for the strongly associated compounds of the above-mentioned English patent and the slightly associated free proteins corresponding to the salts, I, are easily solubilized by the action of a base while the compounds of the English Pat. No. 1,157,528 are scarcely soluble in a basic medium and then only at a relatively high pH of the order of 11 to 12.

The process for preparing the salts of tris-$N^{A_1},N^{B_1},N^{\epsilon B_{29}}$-(X-3 oxo-3 Y-1 propene-1 yl-1)[N$\delta$-(Z-4 R-6 pyrimidinyl-2) ornithine $B_{22}$]-insulins and the corresponding free proteins, likewise object of the invention, is illustrated by the annexed Diagram No. 1. It is characterized essentially in that one condenses the insulin, II, with a $\beta$-diketone Z—$COCH_2CO$—R, Z and R keeping the aforementioned meanings, in a slightly alkaline homogeneous hydroalcoholic medium, to form an alkali-metal salt of tris-$N^{A_1},N^{B_1},N^{\epsilon B_{29}}$-(Z-3 oxo-3 R-1 propene-1 yl-1)[N$\delta$-(Z-4 R-6 pyrimidinyl-2) ornithine $B_{22}$]-insulin, in the form of strongly associated molecular aggregates, insoluble in water, III, subjects the said compound, III, in the presence of an alkali-metal hydroxide, at a pH in the region of 8, to the dissociating action of phenol or one of its substituted derivatives in order to obtain the alkali-metal salt of tris-$N^{A_1},N^{B_1},N^{\epsilon B_{29}}$-(Z-3 oxo-3 R-1 propene-1 yl-1)[N$\delta$-(Z-4 R-6 pyrimidinyl-2) ornithine $B_{22}$]-insulin, in the dissociated or slightly associated state, soluble in water, $I_A$, which one possibly subjects to a controlled acid hydrolysis then causes, in a slightly acid or slightly basic, homogeneous or heterogeneous hydroalcoholic medium, the resulting, dissociated or slightly associated salt of [N$\delta$-(Z-4 R-6 pyrimidinyl-2) ornithine $B_{22}$]-insulin, soluble in water, IV, to react with a $\beta$-diketone X—$COCH_2CO$—Y, X and Y keeping the afore-mentioned meanings, in order to obtain a tris-$N^{A_1},N^{B_1},N^{\epsilon B_{29}}$-(X-3 oxo-3 Y-1 propene-1 yl-1)[N$\delta$-(Z-4 R-6 pyrimidinyl-2) ornithine $B_{22}$]-insulin in the more or less strongly associated state and existing in the form of salt or of free protein according to the reaction or isolation pH, V, which one treats in the presence of an alkali-metal hydroxide, at a pH in the region of 8, with phenol or one of its substituted derivatives, in order to obtain an alkali-metal salt of a tris-$N^{A_1},N^{B_1},N^{\epsilon B_{29}}$-(X-3 oxo-3 Y-1 propene-1 yl-1)[N$\delta$-(Z-4 R-6 pyrimidinyl-2) ornithine $B_{22}$]-insulin, in the dissociated or slightly associated state, soluble in water, $I_B$, then possibly converts the compounds $I_B$ or $I_A$ by the usual methods, into salts of organic or mineral bases, other than alkali-metal salts, soluble in water, or into non-salified free proteins.

The salts of tris-oxoenamines of [N$\delta$-pyrimidinyl-ornithine $B_{22}$]-insulins, the object of the invention, at the same time include homo-substituted salts, $I_A$, and hetero-substituted salts, $I_B$. The salts, I, therefore correspond both to the salts of tris-oxoenamines of [N$\delta$-pyrimidinyl-ornithine $B_{22}$]-insulins for which X is identical to Z, Y and R, and to those for which these substituents are different.

In a presently preferred method of performance, the process according to the invention can specifically be characterized by the points stated hereafter.

The reaction speed of insulin with the $\beta$-diketone Z—$COCH_2CO$—R increasing with the pH, it is desirable to effect this condensation in a basic medium. Too alkaline a pH being able to bring about an irreversible alteration of the proteins in question, finally in general one choses a pH in the region of 8 and one effects the reaction either in the presence of a convenient buffer mixture such as a mixture based on di-alkali and mono-alkali phosphates in suitable proportions, or preferably in the presence of an alkali-metal bicarbonate such as potassium bicarbonate. In this case, in order to avoid the dissociation of the bicarbonate into carbonate, which would bring about an increase of the pH of the reaction medium, one works in a closed container.

The condensation of the insulin with the $\beta$-diketone is effected in an aqueous medium in presence of an organic solvent facilitating the homogenization of the reaction medium while altering neither the insulin nor the resulting condensation compound. As solvent fulfilling these conditions, one uses specifically alcohols such as methanol, ethanol, butanol.

The concentrations in the medium of water, alcohol, diketone and alkali-metal bicarbonate must be such that they ensure the homogeneity of the medium. In the case where the $\beta$-diketone, is acetylacetone, one will use for example the following mixtures:

| Potassium bicarbonate | Percent | | |
|---|---|---|---|
| | Water | Alcohol | Acetyl-acetone |
| 3 to 5 percent | 32 | 32 | 32 |
| Do | 38 | 29 | 29 |
| Do | 48 | 24 | 24 |

In order to carry out the condensation of the insulin and the $\beta$-diketone, one uses a very great excess of $\beta$-diketone, without which the reaction is not complete. It is thus for example that for 1 g. of insulin one uses 20 to 30 g. of acetylacetone which represent sseveral hundred times the stoichiometric quantity.

In the case where the $\beta$-diketone used is acetylacetone, the optimum concentration in the medium of insulin is of the order of 1%. From 2% upwards, the reaction speed starts to diminish and at a concentration of 5% the pyrimidinic cyclization is arrested at about 90% of theory.

The reaction time and temperature are a function of each other. In a hydroethanolic medium, the optimum temperature is of the order of 20 to 25° C. At +2° C. the reaction is arrested well before the pyrimidinic cyclization of the guanidyl group is completed. At +30° C., the alteration of the insulin is already perceptable.

At 20°–25° C., in a hydroethanolic medium, in homogenous phase, in the presence of potassium bicarbonate, the blocking of the amino groups of insulin is rapid, of the order of some hours. On the contrary, the blocking of the guanidyl group is very much slower. In the case where one uses acetylacetone, it reaches about 80% of theory at the end of twenty-four hours, 90% at the end of six days and is only practically complete at the end of twenty days.

The tris-oxoenamines of [N$\delta$-pyrimidinyl-ornithine $B_{22}$]-insulins, III, exist in the form of alkali-metal salt. In general, their titre in alkali-metal is lower than theory (six alkali-metal atoms per molecule), the salification of the six carboxyl groups not being complete at pH=8 of the reaction medium.

The condensation of the β-diketone and of the insulin is accompanied by the progressive formation of a recipitate which is proved to be a mixture of alkali-metal salt of tris-oxoenamine of insulin, VI (see Diagram No. 2) and alkali-metal salt of tris-oxoenamine of [Nδ-pyrimidinyl $B_{22}$]-insulin, III. The reaction progresses probably by partial solubilization of the tris-oxoenamine of insulin which can thus react with the β-diketone, causing a reprecipitation of III, until the blocking of the amino and guanidyl groups is complete.

The profound change of the structure of the tris-oxoenamino [Nδ-pyrimidinyl-ornithine $B_{22}$]-insulin, III, in relation to the starting insulin which is manifested by its insolubility in an aqueous medium between pH 1 and pH=10, is revealed likewise by the measurement of its circular dichroism. One establishes in fact on the curve of circular dichroism of the tris-oxoenamino [Nδ-pyrimidinyl-ornithine $B_{22}$]-insulin, III, that the negative maximum at about 222 mμ, which one could consider as characteristic of the helicoidal configuration of a part of the chain B of the starting insulin, has disappeared. It thus appears that the blocking of the guanidyl group modifies the configuration of the insulin considerably. The compound thus obtained, III, insoluble in water, exists in the form of strongly associated molecular aggregates.

The cohesion of this structure is ensured by non-covalent bonds, hydrogen bonds, hydrophobic bonds resulting from the calling in play of the forces of Van der Waals, electrostatic forces between the polar functions, etc. between the associated constituent molecules.

It has been found in a surprising way and this is an important characteristic of the invention that this form of strong molecular aggregation of the compounds, III, was reversible. One has established in fact that the action, in the presence of an alkali-metal hydroxide, at a pH in the region of 8, of the phenol or of one of its substituted derivatives, was capable of dissociating the molecular aggregates of the alkali-metal salt of the tris-oxoenamine of [Nδ-pyrimidinyl-ornithine $B_{22}$]-insulin, III, and of leading to the alkalin-metal salt of a tris-$N^{A_1}, N^{B_1}, N^{\epsilon B_{20}}$-(Z-3 oxo-3 R-1 propene-1 yl-1) [Nδ-(Z-4 R-6 pyrimidinyl-2) ornithine $B_{22}$]-insulin in the dissociated or slightly associated state, comparable to that of natural insulin, soluble in water $I_A$, and the curve of circular dichroism of which again has a negative maximum at about 200 mμ, a characteristic of the partial helicoidal configuration of the starting insulin.

The dissociation of the molecular aggregates of tris-oxoenamines of [Nδ-pyrimidinyl-ornithine $B_{22}$]-insulins, III, is effected at a pH in the region of 8. This pH is obtained by putting a small quantity of alkali-metal hydroxide in the reaction medium. The use of the mixture phenol-water-aqueous N solution of caustic potash (75–20–5) allows, in general, a satisfactory dissociation to be obtained in ten to fifteen minutes at 200–25° C. The resulting dissociated salt of tris-oxoenamine of [Nδ-pyrimidinyl-ornithine $B_{22}$]-insulins, $1_A$, is then precipitated by an organic solvent, miscible in water, such as acetone and one isolates without delay, by centrifugation, the precipitate thus formed. The compounds, $I_A$, thus obtained correspond theoretically to the alkali-metal hexa salt but can contain in practice an excess or deficiency of metal in relation to theory. They are very soluble in water and in the physiological serum which represents a very great practical interest for their therapeutic use.

Their degree of association is slight. It is probable that these compounds correspond to the association of some fundamental molecules or else even that one is dealing with a free non-associated molecule. This degree of association is not at present known with certainty. It can depend moreover on various factors such as specifically the pH of the medium in which the compound, $I_A$, is dissolved and on its concentration in this medium.

Of course, the preceding considerations do not limit the scope of the invention at all. The compounds, $I_A$, whatever may be their exact degree of association, are part of the invention.

In the compounds, $I_A$, the amino groups and the guanidyl group are blocked by the same β-diketone Z—COCH$_2$CO—R. In order to obtain compounds of the same type, comprising a blocking of the amino groups by a β-diketone X—COCH$_2$CO—Y different from the β-diketone Z—COCH$_2$CO—R which blocks the guanidyl group, one effects a controlled acid hydrolysis of the compound, $I_A$, preferably in the presence of phenol or of one of its substituted derivatives, then causes, in a slightly acid or slightly basic medium, the resulting salt of [Nδ-(Z-4 R-6 pyrimidinyl-2) ornithine $B_{22}$]-insulin, IV, to react with a β-diketone X—COCH$_2$CO—Y.

The controlled hydrolysis of the salt of tris-oxoenamine of [Nδ-pyrimidinyl-ornithine $B_{22}$]-insulin, $I_A$, in order to obtain IV, is effected conveniently by a solution containing 75% of phenol and 25% of aqueous 0.1 N solution of hydrochloric acid. In these conditions, the hydrolysis of the oxoenamino groups is in general complete in some hours at 20°–25° C. and the blocking of the guanidyl group remains unattacked.

Practically, according to a variant indicated further on, one can obtain in a single operation the compound, IV, by direct hydrolysis with simultaneous dissociation of the compound, III, with a solution of phenol in 0.1 N hydrochloric acid (75–25), at pH=1–2 in some hours at 20°–25° C.

If the proportion of sulphuric ashes of the alkali-metal salt of tris-oxoenamine of the dissociated [Nδ-pyrimidinyl-ornithine $B_{22}$]-insulin, $I_A$, exceeds 10%, one proceeds first of all with an elimination of the mineral salts by dissolution in water, precipitation at the isoelectric point at pH=5.3, followed by washings with water. The damp precipitate is hydrolyzed by the mixture of phenol and of aqueous solution of hydrochloric acid.

The salts of acids of [Nδ-pyrimidinyl-ornithine $B_{22}$]-insulin, IV, can easily be converted into water-soluble salts of mineral or organic bases, specifically into alkali-metal salts such as potassium salt. In order to prepare the potassium salt, for example, one neutralizes with caustic potash at pH=5.2 at the isoelectric point, the [Nδ-pyrimidinyl-ornithine $B_{22}$]-insulin hydrochloride, dissolved in water, separates the free [Nδ-pyrimidinyl-ornithine $B_{22}$]-insulin by centrifugation, treats it with a solution of phenol-water-aqueous N solution of caustic potash (75–20–5) and isolates the resulting potassium salt by precipitation with acetone. The other soluble salts of [Nδ-pyrimidinyl-ornithine $B_{22}$]-insulin are prepared in an analogous manner. After precipitation at pH=5.2 and washing, one can obtain in addition the free, non-salified [Nδ-pyrimidinyl-ornithine $B_{22}$]-insulin by centrifugation, then drying.

In the same manner the free [Nδ-pyrimidinyl-ornithine $B_{22}$]-insulin, the soluble salts of mineral or organic bases and specifically the alkali-metal salts of [Nδ-pyrimidinyl-ornithine $B_{22}$]-insulins can be condensed with the β-diketone X—COCH$_2$CO—Y in order to provide the tris-oxoenamines of [Nδ-pyrimidinyl-ornithine $B_{22}$]-insulin, V.

The condensation of the β-diketone X—COCH$_2$CO—Y with the salt of [Nδ-pyrimidinyl-ornithine $B_{22}$]-insulin, IV, is effected in an aqueous, homogeneous or heterogeneous, slightly acid or slightly basic medium, in the presence of a small quantity of alcohol.

In the case of the condensation of the salts of [Nδ-dimethyl-4,6- pyrimidinyl-2)ornithine $B_{22}$]-insulin with the methyl-5 hexane dione-2,4, for example, one operates at a pH in the region of 8. For this one dissolves a salt such as [Nδ-(dimethyl-4,6 pyrimidinyl-2)ornithine $B_{22}$]-insulin hydrochloride in an aqueous solution containing methyl-5 hexane dione-2,4, ethanol and the quantity of potassium bicarbonate necessary to bring the mixture to pH=8. After 7 days' agitation at 20° C., the condensation is complete. The potassium salt of the resulting tris-$N^{A_1}$, $N^{B_1}$, $N^{\epsilon B_{20}}$-(methyl-5 oxo-4 hexene-2 yl-2) [Nδ-(dimethyl- 4,6 pyrimidinyl-2) ornithine $B_{22}$]-insulin is then easily isolated by lyophilization after elimination of the mineral salts by dialysis.

In the case of the condensation of the salts of [Nδ-(dimethyl - 4,6 pyrimidinyl-2) ornithine $B_{22}$]-insulin with cyclohexane dione-1,3, on the contrary, one operates at pH=6, the reaction speed here being far greater at this pH than at pH=8. A salt such as [Nδ-(dimethyl-4,6-pyrimidinyl-2)ornithine $B_{22}$]-insulin hydrochloride is dissolved in a mixture adjusted to pH=6 of aqueous solution of potassium bicarbonate, cyclohexane dione-1,3 and ethanol. At the end of five days' agitation at 25° C., the condensation is complete. The tris-$N^{A_1}$, $N^{B_1}$, $N^{\epsilon B_{20}}$-(oxo-3 cyclohexene - 1 yl-1) [Nδ-dimethyl-4,6 pyrimidinyl-2) ornithine $B_{22}$]-insulin precipitates spontaneously and one isolates it from the reaction medium by centrifugation.

In a general way, the pH zone included between 5.5 and 8.5 is suitable for effecting the condensation of the salt of pyrimidinyl insulin and of the β-diketone X—$COCH_2CO$—Y. If the pH is too low, below the isoelectric point, the oxoenamino groups are no longer stable and if the pH is too high, one risks an irreversible alteration of the proteins.

The resulting tris-oxoenamino [Nδ-pyrimidinyl-ornthine $B_{22}$]-insulin obtained in the form of molecular aggregates more or less associated according to the reaction medium, V, is then dissociated by the action of phenol or one of its substituted derivatives, in the presence of an alkali-metal hydroxide at a pH in the region of 8 and one obtains the alkali-metal salt of the dissociated tris-$N^{A_1}$, $N^{B_1}$, $N^{\epsilon B_{20}}$-(X-3 oxo-3 Y-1 propene-1 yl-1) [Nδ-(Z–4 R–6 pyrimidinyl-2) ornithine $B_{22}$]-insulin, $I_B$, soluble in water and which comprises substituents X and Y different from the substituents Z or R.

This dissociation is effected in conditions analogous to those described previously for tris-oxoenamines of [Nδ-pyrimidinyl-ornithine $B_{22}$]-insulins, III.

The alkali-metal salts of the tris-oxoenamines of heterosubstituted [Nδ-pyrimidinyl-ornithine $B_{22}$]-insulins $I_B$, as well as the alkali-metal salts of the tris-oxoenamines of homosubstituted [Nδ-pyrimidinyl-ornithine $B_{22}$]-insulins $I_A$ can be converted, according to the usual methods, into salts of organic or mineral bases, soluble in water, other than the alkali-metal salts, or into non-salified free proteins.

It is thus that, for example, the alkali-metal salts $I_B$ or $I_A$ are converted into corresponding, non-salified, dissociated free proteins, by precipitation at the isoelectric point at a pH in the region of 5.2, isolation, by suction-filtering or centrifugation of the precipitate thus formed and drying. The free proteins thus obtained corresponding to the salts $I_B$ or $I_A$ can thus be converted into water-soluble salts of mineral or organic bases other than the alkali-metal salts, by the addition of the desired mineral or organic base to an aqueous suspension of the dissociated free protein, then precipitation of the resulting soluble salt of tris-oxoenamine of [Nδ-pyrimidinyl-ornithine $B_{22}$]-insulin by the addition of a desolubilizing solvent such as acetone.

The soluble salts of tris-oxoenamines of [Nδ-pyrimidinyl-ornithine $B_{22}$]-insulins, $I_B$, existing in the dissociated or slightly associated state, consist probably, like the soluble salts of $I_A$, of the association of a few fundamental molecules or else even of a single, non-associated free molecule. The free proteins corresponding to $I_B$ or $I_A$, that is to say tris-$N^{A_1}$, $N^{B_1}$, $N^{\epsilon B_{20}}$-(X-3 oxo-3 Y-1 propene-1 yl-1) [Nδ-(Z-4 R-6 pyrimidinyl-2) ornithine $B_{22}$]-insulins or tris-$N^{A_1}$, $N^{B_1}$, $N^{\epsilon B_{20}}$-(Z-3 oxo-3 R-1 propene-1 yl-1) [Nδ-(Z-4 R-6 pyrimidinyl-2) ornithine $B_{22}$]-insulins, consists likewise of slightly associated molecular aggregates but exist probably in the state of aggregation greater than that of the soluble salts $I_A$ and $I_B$. But these free proteins are not however associated to the same degree as the alkali-metal salts of tris-oxoenamines of [Nδ-pyrimidinyl-ornithine $B_{22}$]-insulins, III, for by the addition of an alkali-metal hydroxide one easily secures their solubilization in an aqueous medium in the form of alkali-metal salt as for natural insulin, while the tris-oxoenamines of [Nδ-pyrimidinyl-ornithine $B_{22}$]-insulins, III, resist to solubilization by the bases up to about pH=10.

Of course these considerations on the exact degree of association of the salts of the trienamino tris-oxoenamines [Nδ-pyrimidinyl-ornithine $B_{22}$]-insulins $I_A$ or $I_B$ as well as corresponding free proteins do not limit the scope of the invention at all.

As has already been pointed out, all of the heterosubstituted salts of tris-oxoenamines of [Nδ-pyrimidinyl-ornithine $B_{22}$]-insulins $I_B$, for which X is different from Z and Y is different from R, and the homosubstituted salts of tris-oxoenamines of [Nδ-pyrimidinyl-ornithine $B_{22}$]- insulins, $I_A$, for which X is equal to Z and Y is equal to R, are of course equivalent to the salts of tris-oxoenamines of [Nδ-pyrimidinyl-ornithine $B_{22}$]-insulins, I, as they have been defined above and for which X and Z and Y and R can be identical or different. It is solely for the purpose of convenience of description that such a distinction has been made.

According to a variant of the process described previously, a variant which is likewise part of the invention, one treats the alkali-metal salt of tris-$N^{A_1}$, $N^{B_1}$, $N^{\epsilon B_{20}}$-(Z-3 oxo-3 R-1 propene-1 yl-1) [Nδ-(Z-4 R-6 pyrimidinyl-2) ornithine $B_{22}$]-insulin existing in the form of strongly associated molecular aggregates, III, with an acid in aqueous solution, in the presence of phenol or of one of its substituted derivatives, in order to obtain directly the corresponding salt of [Nδ-(Z-4 R-6 pyrimidinyl-2) ornithine $B_{22}$]-insulin, in the dissociated or slightly associated form, Phenol or its substituted derivative, in the presence of which one operates, allows the dissociation of the tris-oxoenamines of strongly associated [Nδ-pyrimidinyl-ornithine $B_{22}$]-insulins, III, into water-soluble compounds and a simultaneous hydrolysis of the oxoenamino groups. One thus carries out, at one time without intermediate isolation of the soluble tris-oxoenamines of [Nδ-pyrimidinyl-ornithine $B_{22}$]-insulins, $I_A$, the same reaction sequence as in the process explained previously in order to obtain IV.

The reaction is conveniently effected by means of a mixture of phenol and aqueous 0.1 N solution of hydrochloric acid (75–25). The salt of [Nδ-pyrimidinyl-ornithine $B_{22}$]-insulin, IV, is then precipitated by the addition of an organic solvent such as acetone. In these conditions, for example, the potassium salt of tris-$N^{A_1}$, $N^{B_1}$, $N^{\epsilon B_{20}}$-(oxo-4 pentene-2 yl-2)[Nδ-(dimethyl-4,6- pyrimidinyl-2) ornithine $B_{22}$]-insulin, in the form of strongly associated molecular aggregates, insoluble in water, is converted into [Nδ - dimethyl-4,6-pyrimidinyl-2) ornithine $B_{22}$]-insulin hydrochloride, in the dissociated or slightly associated state, soluble in water, after three hours, agitation at 20°–25° C.

The process which has just been described according to which the condensation of insulin and the β-diketones Z—$COCH_2CO$—R is effected in a homogeneous medium, leads to the obtaining of products, $I_A$, containing a small quantity of impurities detectable by chromatographic analysis. These impurities which, in chromatography on paper, by means of a butanol-acetic acid-water mixture (4–1–5) with impregnation by the lower phase and revelation with the bromophenol blue, are far less mobile than the soluble dissociated tris-oxoenamines of [Nδ-pyrimidinyl-ornithine $B_{22}$]-insulins, $I_A$, and probably consist of irreversibly denatured proteins.

The invention has likewise as object a variant of the process for preparing the Compounds $I_A$ or $I_B$ which avoids the formation of these impurities. This variant illustrated by the annexed Diagram No. 2 is essentially characterized in that one causes the insulin, II, to react with agitation, in a heterogeneous aqueous medium comprising two non-miscible phases, at a slightly alkaline pH, in the presence of phenol or one of its substituted derivatives, with a β-diketone Z—COCH$_2$CO—R in order to obtain in a first reaction period a mixture of alkali-metal salt of tris-N$^{A_1}$, N$^{B_1}$, N$^{\epsilon B_{29}}$-(Z-3 oxo-3 R-1 propene-1 yl-1) insulin, VI, and of alkali-metal salt of tris-N$^{A_1}$, N$^{B_1}$, N$^{\epsilon B_{29}}$-(Z-3 oxo-3 R-1 propene-1 yl-1) [Nδ-(Z-4 R-6 pyrimidinyl-2) ornithine B$_{22}$]-insulin, III, the mixture existing in the state of strongly associated molecular aggregates, insoluble in water, subjects the said mixture of VI and III, at a pH in the region of 8, to the dissociating action of phenol or one of its substituted derivatives in order to obtain a mixture of alkali-metal salt of tris-N$^{A_1}$, N$^{B_1}$, N$^{\epsilon B_{29}}$-(Z-3 oxo-3 R-1 propene-1 yl-1) [Nδ-(Z-4 R-6 pyrimidinyl-2) ornithine B$_{22}$]-insulin, III, the mixture existing in the state of strongly associated molecular aggregates, insoluble in water, subjects the said mixture of VI and III, at a pH in the region of 8, to the dissociating action of phenol or one of its substituted derivatives in order to obtain a mixture of alkali-metal salt of tris-N$^{A_1}$, N$^{B_1}$, N$^{\epsilon B_{29}}$-(Z-3 oxo-3 R-1 propene-1 yl-1) insulin, VII, and of alkali-metal salt of tris-N$^{A_1}$, N$^{B_1}$, N$^{\epsilon B_{29}}$-(Z13 oxo-3 R-1 propene-1 yl-1) [Nδ-(Z-4 R-6 pyrimidinyl-2) ornithine B$_{22}$[-insulin, I$_A$, a mixture existing in the dissociated or slightly associated form, soluble in water, then causes to act on the said mixture of the Compounds VIII and I$_A$, in a second reaction period in conditions identical to those of the first period, in a slightly alkaline medium, the β-diketone Z—COCH$_2$CO—R in order to obtain an alkali-metal salt of tris-N$^{A_1}$, N$^{B_1}$, N$^{\epsilon B_{29}}$-(Z-3 oxo-3 R-1 propene-1 yl-1) [Nδ-(Z-4 R-6 pyrimidinyl-2) ornithine B$_{22}$]-insulin, III, restored once more to the state of strongly associated molecular aggregates, insoluble in the reaction medium or in water between pH=1 and pH=10.

The dissociating action of phenol or of one of its substituted derivatives on the strongly associated compounds, III, then leads to alkali-metal salts of dissociated tris-oxoenamines of [Nδ-pyrimidinyl-ornithine B$_{22}$]-insulin, I$_A$, for which chromatographic analysis no longer detects any impurity.

According to a presently preferred method of performance, this variant of the process of the invention can be characterized by the points stated hereafter.

The condensation of the insulin, II, with the β-diketone is effected in an aqueous heterogeneous medium in the presence of an alcohol such as ethanol. The basicity of the medium is ensured by adding either a suitable buffer mixture such as a mixture of di-alkali phosphate and mono-alkali phosphate, or preferably an alkali-metal bicarbonate such as potassium bicarbonate.

The insulin introduced into the heterogeneous reaction medium reacts, on the one hand, rapidly and almost totally at the level of the amino groups to form three oxoenamino groups and, on the other hand, with a considerably slower speed on the guanidyl group of the arginine residue, forming a mixed precipitate of tris-oxoenamine of insulin, VI, and of tris-oxoenamino of [Nδ-pyrimidinyl-ornithine B$_{22}$]-insulin, III, in the form of molecular aggregates insoluble in the reaction medium or in water between pH=1 and pH=10.

In the case where one causes acetylacetone to react with insulin, for example, the condensation can be effected in the following mixtures:

| Insulin | Potassium bicarbonate | Water | Acetylacetone | Phenol | Ethanol |
|---|---|---|---|---|---|
| | | Percent | | | |
| 1 to 2 percent | 3-6 | 28 | 24 | 24 | 18 |
| Do | 3-6 | 28 | 28 | 28 | 9 |

In these mixtures which provide satisfactory results but which evidently have no limitative character, the relative proportions of phenol and alcohol are such that they ensure a total insolubility of the mixed precipitate of tris-oxoenamine of insulin, VI, and of tris-oxoenamine of [Nδ-pyrimidinyl-ornithine B$_{22}$]-insulin, III.

Tris-oxoenamine of insulin, VI, and tris-oxoenamine of [Nδ-pyrimidinyl-ornithine B$_{22}$]-insulin, III, exist in the form of alkali-metal salts. In general, however, their titre in alkali-metal is lower than theory (6 alkali-metal atoms per molecule), the salification of the six carboxyl groups not being total at pH=8 in the reaction mixture.

The exact structure of the mixed precipitate of tris-oxoenamine of insulin, VI, and of tris-oxoenamine of [Nδ-pyrimidinyl-ornithine B$_{22}$]-insulin, III, is not known with certainty. In fact one does not know whether there exists separately molecular aggregates of III and molecular aggregates VI or else mixed aggregates of III and VI. Be that as it may, the mixed precipitate obtained indeed consists of a mixture of tris-oxoenamine of insulin and tris-oxoenamine of [Nδ-pyrimidinyl-ornithine B$_{22}$]-insulin, the whole forming a precipitate insoluble in water.

The condensation of insulin and of the β-diketone being effected in a heterogeneous phase necessitates good agitation of the reaction medium; agitation in a rotary mixer at a speed of 200 to 300 r.p.m. gives satisfactory results.

If one uses phenol/alcohol ratios of 10/35 (single phase) or on the contrary 50/5, the solubility of the mixed percipitate in the medium is more considerable and the reaction speed greater, but one establishes in both cases that the resulting tris-oxoenamine of [Nδ-pyrimidinyl-ornithine B$_{22}$]-insulin, I$_A$, finally obtained, partially altered. The phenol/alcohol ratio is therefore held within quite narrow limits if one wants to obtain products free from any alteration.

As in a homogeneous medium, the optimum reaction temperature is situated in the region of 20°–25° C. At this temperature the reaction speed with the guanidyl group is not very great. In the case of acetylacetone, at the end of twenty days' agitation of the heterogeneous medium, about 30% of free guanidyl group still remains.

But the use of a higher temperature or of more solubilizing reaction mixtures in order to improve the reaction speed leads to an alteration of the compounds thus formed.

In order to block the 30% of free guanidyl group, while avoiding any alteration, one does not seek to accelerate the reaction speed but one proceeds with the dissociation of the strongly condensed molecular aggregates of the alkali-metal salt of tris-oxoenamine of insulin, VI, and of the alkali-metal salt of tris-oxoenamine of [Nδ-pyrimidinyl-ornithine B$_{22}$]-insulin, III, by the action, in a slightly alkaline medium, of phenol or of one of its substituted derivatives, then one proceeds to the second reaction period in conditions identical to those of the first period.

In order to effect this dissociation practically one uses conveniently a mixture of phenol and water (75–3). The mixture of alkali-metal salt of tris-oxoenamine, VI, and of alkali-metal salt of tris-oxoenamine of [Nδ-pyrimidinyl-ornithine B$_{22}$]-insulin, III, is introduced into the solution of aqueous phenol alkalinized to pH=8 by an alkali-metal bicarbonate such as potassium bicarbonate. One then adds an excess of alkali-metal bicarbonate and agitates for about ten minutes. The subsequent condensation with β-diketone Z—COCH$_2$OC—R will then be effected directly on the preceding bicarbonated phenolic solution, without intermediate isolation in the same conditions as for the first reaction period. The mixture of tris-oxoenamine of insulin, VII, and of tris-oxoenamine of [Nδ-pyrimidinyl-ornithine B$_{22}$]-insulin, I$_A$, thus obtained exists in the form of alkali-metal salt, but the salification of the six carboxyl groups is not total at pH=8 and the titre in alkali-metal of the compounds I$_A$ and VII is in general lower than theory (6 alkali-metal atoms per molecule). In order to complete the pyrimidinic cyclization, one causes the β-diketone to react on the mixture of alkali-metal salts of soluble dissociated tris-oxoenamine of insulin, VII, and of soluble dissociated tris-oxoenamine of [Nδ-pyrimidinyl-ornithine $B_{22}$]-insulin, $I_A$, in a slightly alkaline, heterogeneous, aqueous medium, and in the presence of a solvent such as alcohol. One uses preferably as alkaline agent a bicarbonate such as potassium bicarbonate. In the case of acetylacetone, the pyrimidinic cyclization is terminated in 4 to 5 days at 20°–25° C. The durations of the two reaction periods for a total pyrimidinic cyclization are, for example, the following: 1st period: 15 days; 2nd period: 5 days or 1st period: 10 days; 2nd period: 10 days.

One thus obtains the alkali-metal salt of tris-oxoenamine of [N$\delta$-pyrimidinyl-ornithine $B_{22}$]-insulin existing in the form of strongly associated molecular aggregates, III, which is subsequently converted according to the principal process described above. The soluble, dissociated tris-oxoenamines of [N$\delta$-pyrimidinyl-ornithine $B_{22}$]-insulin, $I_A$, then obtained by dissociation with phenol do not however contain any impurity detectable by chromatographic analysis.

In that which precedes, the structure given is specifically that of insulin of bovine origin.

In the following examples, the raw material is bovine insulin.

The invention likewise extends to all the other insulins, whatever may be the origin (pig, sheep, horse, etc.).

The following examples illustrate the invention without however limiting it.

EXAMPLE 1

Potassium salt of tris-$N^{A_1}$,$N^{B_1}$,$N^{\epsilon B_{29}}$-(oxo-4 pentene-2 yl-2) [N$\delta$-dimethyl-4,6 pyrimidinyl-2) ornithine $B_{22}$]-insulin in dissociated or slightly associated form, soluble in water, $I_A$, with R=Z=CH$_3$, by reaction in a homogeneous medium Stage A.—Potassium salt of tris-$N^{A_1}$,$N^{B_1}$,$N^{\epsilon B_{29}}$-(oxo-4 pentene-2 yl-2) [N$\delta$-dimethyl-4,6 pyrimidinyl-2) ornithine $B_{22}$]-insulin in the form of strongly associated molecular aggregates, insoluble in water, III, with R=Z=CH$_3$: One dissolves 12 g. of insulin in 480 cc. of an aqueous solution of 7% potassium bicarbonate. One adds 300 cc. of acetylacetone and 360 cc. of 95° alcohol. One subjects to agitation in an inert atmosphere and sheltered from the light for twenty days at 25° at pH 8.3. A precipitate appears which one separates by centrifugation. One washes this precipitate with water, then with acetone and ether. One dries in vacuo at ambient temperature. One thus collects 7.73 g. of potassium salt of tris-$N^{A_1}$,$N^{B_1}$,$N^{\epsilon B_{29}}$-(oxo-4 pentene-2 yl-2) [N$\delta$-(dimethyl-4,6 pyrimidinyl-2) ornithine $B_{22}$]-insulin in the form of strongly associated molecular aggregates, which appears in the form of a colourless powder, insoluble in water, in acetic acid and in dilute hydrochloric acid, partially soluble in 0.1 N ammonia, soluble in soda or potash solution at pH=about 12.

In chromatography on paper, the mobility of the product in different systems of solvents in acid or basic medium is nil.

In fine-zone chromatography on cellulose silica gel, the mobility of the product is nil.

The product, in strongly associated form, is likewise characterized by its dichroic absorption. The curve of circular dichroism displays a positive maximum at 303 m$\mu$ and does not display a negative maximum at 222 m$\mu$.

Circular dichroism (in aqueous 0.15 M NaCl solution readjusted to 0.003 N by NaOH 0.1 N):

$\Delta E^{1\%}_{1cm.} \times 10^3$ at 303 m$\mu$ = +15.9 at 216 m$\mu$ = −435 at 210 m$\mu$ = −466 at 195 m$\mu$ = +394

Analysis.—$C_{274}H_{393}O_{78}N_{65}S_6K_6$=6,282.531. Sulphuric ashes: 5.9–6.2% (theory: 8.35%, for 6 K). Solvation at 100° C. in vacuo: 4.9%. Free guanidine: ≤6.7% (colorimetric analysis by the Sakaguchi reaction. Bi-dimensional chromatography on paper or on fine zone by hydrochloric hydrolysate (6 N hydrochloric acid, twenty-four hours at 100° C.) shows the absence of arginine (quantity less than 5% of theory) and the presence of hydroxy-2 dimethyl-4,6 pyrimidine resulting from the hydrolysis of the dimethyl-4,6 pyrimidinyl-2 function on N$\delta$-ornithine $B_{22}$ nitrogen. Acid-freeable acetyleacetone: 3.8% (being 2.24 mol/mole) colorimetric analysis by orthophenylenediamine at 500 m$\mu$ after hydrolysis with 2 N hydrochloric acid, in sealed tube at 100° C., for twenty minutes). The analyses of acid-freeable acetylacetone give lower values than the theoretical values by reason of the difficulty of freeing the acetylacetone completely without destroying it partially. Zinc: 0.30% (by polarography).

U.V. spectrum (in aqueous NaCl 0.15 M NaOH 0.003 N solution):

Infl. at about 240 m$\mu$ $E^{1\%}_{1cm.}$=78

Max. at 309 m$\mu$ $E^{1\%}_{1cm.}$=91

As far as is known, this compound is not described in the literature.

Stage B.—Potassium salt of tris-$N^{A_1}$,$N^{B_1}$,$N^{\epsilon B_{29}}$-(oxo-4 pentene-2 yl-2) [N$\delta$-(dimethyl-4,6 pyrimidinyl-2) ornithine $B_{22}$]-insulin in the dissociated or slightly associated form, soluble in water: Into 350 cc. of a solution of phenol-water-N caustic potash (75–20–5) at pH=8, one introduces at 20° C., under agitation and in an inert atmosphere, 7 g. of the compound obtained in stage A, of Example No. 1, operating protected from the light; one continues agitation for ten minutes and pours the reaction mixture into 3 litres of acetone at 20° C. One leaves to decant for fifteen minutes protected from the light, eliminates the maximum of supernatant liquid; the rest of the suspension is centrifuged; one washes the precipitate with acetone then with ether and dries with a current of argon, then in vacuo for one night, at ambient temperature; one collects 6.80 g. of crude product which one washes with acetone, then with ether, then dries; one obtains 6.38 g. of potassium salt of tris-$N^{A_1}$,$N^{B_1}$,$N^{\epsilon B_{29}}$-(oxo-4 pentene-2 yl-2) [N$\delta$-(dimethyl-4,6 pyrimidinyl-2) ornithine $B_{22}$]-insulin, in the dissociated or slightly associated form, soluble in water (Yield: 91%).

Analysis.—Loss in vacuo at 100° C.: 4.6%. Sulphuric ashes: 9.6–9.9% (theory: 8.35% for 6 K atoms). Free guanidine: <3%. Acid-freeable acetylacetone: 4.25% (2.9 mol/mole, taking solvation into account). Zinc: 0.27% (polarographic analysis).

U.V. spectrum (in aqueous NaCl 0.15 M solution):

Infl. at about 279 m$\mu$ $E^{1\%}_{1cm.}$=29

Infl. at about 285 m$\mu$ $E^{1\%}_{1cm.}$=36

Max. at 311 m$\mu$ $E^{1\%}_{1cm.}$=86

In aqueous solution NaCl 0.15 M NaOH 0.1 N quantity sufficient to have 0.003 N:

Max. at 239 m$\mu$ $E^{1\%}_{1cm.}$=104

Max. at 309 m$\mu$ $E^{1\%}_{1cm.}$=91

Circular dichroism (in aqueous NaCl 0.15 M solution):

$\Delta E^{1\%}_{1cm.} \times 10^3$ at 222 m$\mu$ = −166 at 210–209 m$\mu$ = −246 at 195–193 m$\mu$ = +426

Behaviour characteristic of a partially helicoidal configuration like insulin.

Chromatography on paper impregnated with 10% acetic acid or the lower phase of the following mixture: n-butanol-acetic acid-water (4–1–5), the upper phase serving as migration solvent. One reveals with the blue bromophenol and observes a R$_f$ equal to that of insulin. One ascertains the presence of traces of impurities R$_f$=0, resulting from a slight irreversible denaturation of the insulin.

Bidimensional chromatography on paper of the hydrochloric hydrolysate (6 N hydrochloric acid, twenty-four hours at 100° C.) shows the presence of all the amino acids of insulin except arginine, the presence of hydroxy-2 dimethyl-4,6 pyrimidine.

As far as is known, this compound is not described in the literature.

EXAMPLE 2

Potassium salt of tris-$N^{A_1},N^{B_1},N^{\varepsilon B_{29}}$-(oxo-4 pentene-2 yl-2) [Nδ-(dimethyl-4,6 pyrimidinyl-2) ornithine $B_{22}$]-insulin, in the dissociated or slightly associated form, soluble in water, $I_A$, with R=Z=CH$_3$ by reaction in a heterogeneous phase Stage A.—(1st period) mixture of potassium salt of tris-$N^{A_1},N^{B_1},N^{\varepsilon B_{29}}$-(oxo-4 pentene-2 yl-2)-insulin, VI, with R=Z=CH$_3$ and of potassium salt of tris-$N^{A_1},N^{B_1}$, $N^{\varepsilon B_{29}}$-(oxo-4 pentene-2 yl-2) [Nδ-(dimethly-4,6 pyrimidinyl-2) ornithine $B_{22}$]-insulin, III, with R=Z=CH$_3$, in the form of strongly associated molecular aggregates, insoluble in water: One introduces 2.5 g. of insulin into a mixture with two non-miscible phases, composed of: 12.5 g. of potassium bicarbonate, 75 cc. of water, 75 cc. of acetylacetone, 75 cc. of phenol and 25 cc. of 95° alcohol, under agitation, in an inert atmosphere and sheltered from the light; the pH is 8.6; one continues agitation for fifteen days at 25° C.; at the end of this time, the pH remains unchanged; one centrifuges the emulsion thus obtained, eliminates the supernatant liquid and triturates the residue of centrifugation with a spatula; one again eliminates the supernatant liquid, adds water to the precipitates to disintegrate it, centrifuges for ten minutes at +20° C., eliminates the supernatant liquid; one washes the precipitate with water by trituration and again centrifuges.

One thus obtains a mixture of potassium salt of tris-$N^{A_1},N^{B_1},N^{\varepsilon B_{29}}$-(oxo-4 pentene-2 yl-2)-insulin and of potassium salt of tris-$N^{A_1},N^{B_1},N^{\varepsilon B_{29}}$-(oxo-4 pentene-2 yl-2) [Nδ-(dimethyl-4,6 pyrimidinyl-2) ornithine $B_{22}$]-insulin in the form of strongly associated molecular aggregates, insoluble in water which one can isolate and dry.

Stage B.—(Dissociation) mixture of potassium salt of tris-$N^{A_1},N^{B_1},N^{\varepsilon B_{29}}$-(oxo-4 pentene-2 yl-2)-insulin, VII, with R=Z=CH$_3$ and of potassium salt of tris-$N^{A_1},N^{B_1},N^{\varepsilon B_{29}}$-(oxo-4 pentene-2 yl-2) [Nδ-(dimethyl-4,6 pyrimidinyl-2) ornithine $B_{22}$]-insulin, $I_A$, with Z=R=CH$_3$ in the dissociated or slightly associated form, soluble in water: To the damp residue obtained in stage A of Example No. 2, one adds a solution of 75 cc. of phenol and 3 cc. of water brought to +20 C., and agitates for five minutes in an inert atmosphere and sheltered from the light; one obtains a clear solution at pH=7 to which one adds 2.5 g. of potassium bicarbonate and continues agitation for ten minutes; the pH is 8.2; one thus obtains in solution a mixture of potassium salt of tris-$N^{A_1},N^{B_1},N^{\varepsilon B_{29}}$-(oxo-4 pentene-2 yl-2)-insulin and of potassium salt of tris-$N^{A_1},N^{B_1},N^{\varepsilon B_{29}}$-(oxo-4 pentene-2 yl-2) [Nδ-(dimethyl-4,6 pyrimidinyl-2) ornithine $B_{22}$]-insulin in the dissociated or slightly associated form which one can possibly isolate according to an appropriate method.

Stage C.—(2nd period) potassium salt of tris-$N^{A_1},N^{B_1}$, $N^{\varepsilon B_{29}}$-(oxo-4 pentene-2 yl-2) [Nδ-(dimethyl-4,6 pyrimidinyl-2) ornithine $B_{22}$]-insulin in the form of strongly associated molecular aggregates, insoluble in water, III, with R=Z=CH$_3$: To the solution obtained in stage B of Example No. 2, one adds, in an inert atmosphere and under agitation, a solution of 50 cc. of water, 10 g. of potassium bicarbonate, 25 cc. of 95° alcohol and 75 cc. of acetylacetone, and continues agitation for seven days at 25° C.; the pH is then 8.6; one centrifuges, washes the residue of centrifugation by trituration in water and eliminates the supernatant liquid; one washes the precipitate with water, with acetone, then with ether and dries with a current of nitrogen, then in vacuo for one night, at ambient temperature; one obtains 2.37 g. of potassium salt of tris-$N^{A_1},N^{B_1},N^{\varepsilon B_{29}}$-(oxo-4, pentene-2 yl-2) [Nδ-(dimethyl-4,6 pyrimidinyl-2) ornithine $B_{22}$]-insulin, in the form of strongly associated molecular aggregates, insoluble in water (yield: 90%).

The product appears in the form of a white powder, insoluble in water and most of the organic solvents, soluble in 0.1 N caustic soda at pH=11–12.

*Analyses.*—Acid-freeable acetylacetone: 3.9% (being 2.3 mol/mole). Free guanidine: 3.7%. Solvation: 3.2%. Sulphuric ashes: 6.6% (theory for 6 potassium atoms: 8.3%).

U.V. spectrum (in aqueous NaCl 0.15 NaCl 0.15 M NaOH 0.003 N solution):

Infl. at about 238 mµ $E^{1\%}_{1cm.}=92$

Max. at 308 mµ $E^{1\%}_{1cm.}=90$

Circular dichroism (in aqueous solution NaCl 0.15 M caustic soda 0.1 N sufficient quantity for pH=11):

$\Delta E^{1\%}_{1cm.} \times 10^3$ at 320 mµ = −39.7 at 296 mµ = +16.6 at 216 mµ = −473 at 195 mµ = +957

The dichroism curve does not display a negative maximum at 222 mµ.

Chromatography on paper: revelation with bromophenol blue. Solvent: secondary butanol-10% acetic acid (1–1), $R_f=0$. Solvent: n-butanol-acetic acid-water (4–1–5) upper phase; paper impregnated by the lower phase, $R_f=0$.

As far as is known, this compound is not described in the literature.

Stage D—(Dissociation) potassium salt of tris-$N^{A_1}$, $N^{B_1}$, $N^{\varepsilon B_{29}}$-(oxo-4 pentene-2 yl-2) [Nδ-(dimethyl-4,6 pyrimidinyl-2) ornithine $B_{22}$]-insulin in the dissociated or slightly associated form, soluble in water: One introduces 2.30 g. of strongly associated molecular aggregates obtained in stage C of Example No. 2, into 156 cc. of a solution of phenol-water-aqueous N solution of caustic potash (75–20–5), of pH=8; one agitates in an inert atmosphere, sheltered from the light, at 20° C. for fifteen minutes; one filters, adds 1560 cc. of acetone under agitation and under nitrogen, leaves to stand for fifteen minutes and eliminates so far as possible the supernatant liquid, one separates the precipitate by centrifugation, washes it with acetone, then with ether, and drives it with a current of nitrogen, then in vacuo for one night; one obtains 2.27 g. of potassium salt of tris-$N^{A_1}$, $N^{B_1}$, $N^{\varepsilon B_{29}}$-(oxo-4 pentene-2 yl-2) [Nδ-(dimethyl-4,6 pyrimidinyl-2) ornithine $B_{22}$]-insulin, in the dissociated or slightly associated form, soluble in water (yield by weight: 96%). Overall yield by weight: 86% starting from insulin.

The product appears in the form of a white powder, soluble in water and physiological serum at concentrations higher than 20%, and insoluble in most of the usual organic solvents.

Analysis.—Solvation: 6.7%. Free guanidine: ≤3.7%. Acid-freeable acetylacetone: 4.1% (2.45 mol/mole). Sulphuric ashes: 8–8.2% (theory: 8.35% for 6 K atoms).

U.V. spectrum (in aqueous solution NaCl 0.15 M NaOH 0.1 N quantity sufficient to have 0.003 N):

Infl. at about 231 mµ $E^{1\%}_{1cm.}=108$

Max. at 308 mµ $E^{1\%}_{1cm.}=87$

The U.V. spectrum indicates the presence of groups

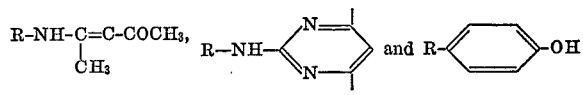

Circular dichroism:

(1) Aqueous solution NaCl 0.15 M NaOH 0.1 N to make pH=11.4:

$\Delta E_{1cm.}^{1\%} \times 10^3$ at 317 m$\mu$ = +3.9 at 218 m$\mu$ = −185 at 207 m$\mu$ = −473 at 194 m$\mu$ = +296

(2) Aqueous solution NaCl 0.15 M, pH=8.5:

$\Delta E_{1cm.}^{1\%} \times 10^3$ at 262 m$\mu$ = −4 at 220 m$\mu$ = −205 at 208 m$\mu$ = −280 at 195 m$\mu$ = +622

The inflexion at about 220m$\mu$ is characteristic of the partial helicoidal configuration comparable to that of natural insulin.

As far as is known, this compound is not described in the literature.

Control of the blocking in the form of oxoenamines of the amino groups $N^{A_1}$ of glycine, $N^{B_1}$ of phenylalanine and $N^{\epsilon B_{29}}$ of lysine by N-dansylation. [B. S. Hartley and V. Massey, Biochim. Biophys. Acta., 21, 58 (1956); W. R. Gray and B. S. Hartley, Biochem. J., 89, 59 P (1963)].

One treats the derivative, I, in aqueous bicarbonated solution, with dansyl chloride in acetonic solution at 20° C., for twenty hours, then one dialyses and concentrates to dryness in vacuo. The residue is hydrolysed with 6 N hydrochloric acid at 100° C. for seventeen hours.

The hydrolysate is chromatographed on a Merck plate of silica gel. Solvent: methyl acetate-isopropanol-ammonia (45–35–20). One reveals, by fluorescene in U.V.: presence of less than 5% of N$\epsilon$DNS-lysine, absence of N-DNS-glycine and of N-DNS-phenylalanine, while, in the case of insulin treated in the same way, one sees these three derivatives appear very clearly.

EXAMPLE 3

[N$\delta$-(dimethyl-4,6 pyrimidinyl-2) ornithine B$_{22}$]-insulin hydrochloride, in the dissociated or slightly associated form, IV, with Z=R=CH$_3$, starting from tris-$N^{A_1}$, $N^{B_1}$, $N^{\epsilon B_{29}}$-(oxo-4 pentene-2 yl-2) [N$\delta$-(dimethyl-4,6 pyrimidinyl-2) ornithine B$_{22}$]-insulin, potassium salt, soluble in water One dissolves 2.489 g. of potassium salt of tris-$N^{A_1}$, $N^{B_1}$, $N^{\epsilon B_{29}}$-(oxo-4 pentene-2 yl-2) [N$\delta$-(dimethyl-4,6 pyrimidinyl-2) ornithine B$_{22}$]-insulin, obtained in stage D of Example No. 2, in 30 cc. of water; the solution is at pH=about 9; one takes the pH to 5.2 by the addition of N hydrochloric acid, centrifuges at ambient temperature, eliminates the supernatant liquid, washes the precipitate with water and centrifuges; one adds to the residue of centrifugation a solution of 12.1 cc. of water, 124 cc. of phenol and 4.1 cc. of N hydrochloric acid; the solution obtained is at pH=about 1; one agitates at 25° C., for three hours, filters, adds 1650 cc. of acetone, centrifuges, washes the residue with acetone, then with ether and dries with a current of nitrogen, then in vacuo for one night; one obtains 2 g. of [N$\delta$-(dimethyl-4,6 pyrimidinyl-2) ornithine B$_{22}$]-insulin hydrochloride, in the dissociated or slightly associated form, in the form of a colourless powder, soluble in water, insoluble in the organic solvents (yield: >83%).

Analysis.—C$_{259}$H$_{387}$O$_{75}$N$_{65}$S$_6$Cl$_6$=6016.33. Cl: 4.2% (theory: 3.5%). Loss in vacuo at 100° C.: 5.6%.

U.V. spectrum:

(1) Aqueous solution NaCl 0.15 M+NaOH 0.1 N quantity sufficient to have 0.003 N:

Max. at 235 m$\mu$ $E_{1cm.}^{1\%}$=105

Max. at 292 m$\mu$ $E_{1cm.}^{1\%}$=26.2

(2) Aqueous solution HCl 0.1 N after about fifteen minutes' contact at 20° C.:

Infl. at about 272–273 m$\mu$ $E_{1cm.}^{1\%}$=14.6

Max. at 277 m$\mu$ $E_{1cm.}^{1\%}$=15.8

Infl. at about 283–284 m$\mu$ $E_{1cm.}^{1\%}$=13.1

Max. at 307–308 m$\mu$ $E_{1cm.}^{1\%}$=9.4 (after three hours max. at 308 m$\mu$ $E_{1cm.}^{1\%}$=about 9.1)

which shows the absence of oxoenamine function and the presence of a pyrimidinyl group per mole.

Circular dichroism:

(1) In aqueous solution NaCl 0.15 M NaOH 0.003 N (pH=10.9):

$\Delta E_{1cm.}^{1\%} \times 10^3$ at 219–220 m$\mu$ = −277 at 206–207 m$\mu$ = −431 at 193 m$\mu$ = +493

(2) In aqueous solution HCl 0.1 N (pH=2):

$\Delta E_{1cm.}^{1\%} \times 10^3$ at 272 m$\mu$ = −4.98 at 220 m$\mu$ = −204 at 208 m$\mu$ = −261 at 195 m$\mu$ = +535

As far as is known, this compound is not described in the literature.

EXAMPLE 4

[N$\delta$-(dimethyl-4,6 pyrimidinyl-2) ornithine B$_{22}$]-insulin hydrochloride, in the dissociated or slightly associated form, IV, with Z=R=CH$_3$, starting from the potassium salt of tris-$N^{A_1}$, $N^{B_1}$, $N^{\epsilon B_{29}}$-(oxo-4 pentene-2 yl-2) [N$\delta$-dimethyl-4,6 pyrimidinyl-2) ornithine B$_{22}$]-insulin in the form of strongly associated molecular aggregates, insoluble in water.

One dissolves 600 mg. of strongly associated potassium salt of tris-$N^{A_1}$,$N^{B_1}$,$N^{\epsilon B_{29}}$-(oxo-4-pentene-2 yl-2) [N$\delta$-dimethyl - 4,6 - pyrimidinyl-2) ornithine B$_{22}$]-insulin, obtained in stage C of Example No. 2, in 40 cc. of a solution of phenol-0.1 N hydrochloric acid (75–25) of pH= 0.5; one brings the solution to pH=2 by the addition of N hydrochloric acid, purges under an inert atmosphere and agitates for three hours at 25° C.; one filters, adds 400 cc. of acetone, leaves the precipitate to settle for fifteen minutes, eliminates the maximum of supernatant liquid and centrifuges; one washes the precipitate with acetone, then with ether and dries with a current of nitrogen, then in vacuo at ambient temperature; one obtains 547 mg. of [N$\delta$-(dimethyl-4,6-pyrimidinyl-2) ornithine B$_{22}$]-insulin hydrochloride in the dissociated or slightly associated form, in the form of a colourless powder, soluble in water, insoluble in the organic solvents (yield by weight: 91%).

Analysis.—Calcd. for C$_{259}$H$_{387}$O$_{75}$N$_{65}$S$_6$Cl$_6$ (=6016.33) (percent): C, 51.8; H, 6.5; Cl, 3.5. Found (percent): C, 51.9; H, 6.8; Cl, 4.1. Loss in vacuo at 100° C.: 4.8%.

Circular dichroism (in aqueous solution NaCl 0.15 M NaOH 0.1 N quantity sufficient to have 0.003 N):

$\Delta E_{1cm.}^{1\%} \times 10^3$ at 222 m$\mu$ = −174 at 207–208 m$\mu$ = −378 at 194 m$\mu$ = +435

The negative maximum at 222 m$\mu$ characterizes the partially helicoidal configuration as in insulin.

U.V. Spectrum (HCl 0.1 N):

Infl. at about 271 m$\mu$ $E_{1cm.}^{1\%}$=13.8

Max. at 275 m$\mu$ $E_{1cm.}^{1\%}$=15.4

Infl. at about 282 m$\mu$ $E_{1cm.}^{1\%}$=12.6

Max. at 306 m$\mu$ $E_{1cm.}^{1\%}$=8.4

U.V. spectrum (in aqueous solution NaCl 0.15 M NaOH 0.1 N quantity sufficient to have 0.003 N):

Max. at 234 m$\mu$ $E_{1\ cm.}^{1\%}$=99

Max. at 293–294 m$\mu$ $E_{1\ cm.}^{1\%}$=25.9

Chromatography on paper:

(1) With solvent: n-butanol-acetic acid-water (4–1–5) (upper phase). Impregnation of the paper with the lower phase. $R_f$ almost identical to that of insulin.
(2) With solvent: secondary butanol-10% acetic acid (1–1). Impregnation of the paper with 10% acetic acid. $R_f$ slightly lower than that of insulin.

EXAMPLE 5

Potassium salt of [N$\delta$-(dimethyl-4,6 pyrimidinyl-2) ornithine $B_{22}$]-insulin in the dissociated or slightly associated form, soluble in water One dissolves 300 mg. of the hydrochloride obtained in Example No. 3, in 30 cc. of water; the pH of the solution is 2.66; one brings the pH to 5.2 by the addition of 1.5 cc. of 0.1 N caustic soda, under agitation and under an inert atmosphere, at 20° C. One centrifuges for three minutes, eliminates the supernatant liquid, washes the precipitate with water and centrifuges; one dissolves the residue of centrifugation in a solution of 15 cc. of phenol and 1 cc. of N caustic potash, under agitation and in an inert atmosphere; one adds 200 cc. of acetone, washes the precipitate with acetone, then with ether and dries it with a current of nitrogen, then in vacuo, for one night; one obtains 276 mg. of potassium salt of [N$\delta$-(dimethyl-4,6 pyrimidinyl-2) ornithine $B_{22}$]-insulin, in dissociated or slightly associated form, in the form of a colourless powder, soluble in water and physiological serum and insoluble in the organic solvents (yield: 92%).

*Analysis.*—Sulphuric ashes: 7.3–7.6% (theory for 6 K=8.6%). Loss in vacuo at 100° C.: 5.7%.

U.V. spectrum (aqueous solution NaCl 0.15 M NaOH 0.1 N quantity sufficient to have 0.003 N):

Max. at 237 m$\mu$ $E_{1\ cm.}^{1\%}$=89

Max. at 294 m$\mu$ $E_{1\ cm.}^{1\%}$=19.5

In HCl 0.1 N max. at 307 m$\mu$ $E_{1\ cm.}^{1\%}$=about 9.7

This spectrum shows the absence of oxoenamine function and the presence of a pyrimidinyl group per mole.

Circular dichroism:

(1) In aqueous solution NaCl 0.15 M NaOH 0.1 N quantity sufficient to have 0.003 N (pH=11):

$\Delta E_{1\ cm.}^{1\%} \times 10^3$ at 220 m$\mu$=−253 at 208 m$\mu$=−384 at 193 m$\mu$=+425

(2) In aqueous solution HCl 0.1 N (pH=2):

$\Delta E_{1\ cm.}^{1\%} \times 10^3$ at 270 m$\mu$=−4.4 at 221 m$\mu$=−180 at 208 m$\mu$=−217 at 195 m$\mu$=+498

(3) In aqueous solution ClNa 0.15 M (pH=7.35):

$\Delta E_{1\ cm.}^{1\%} \times 10^3$ at 267 m$\mu$=−6.0 at 220 m$\mu$=−203 at 208 m$\mu$=−281

Curves of the same behavior as that of natural insulin with inflexion at about 22 m$\mu$.

Chromatography on paper (revelation bromophenol blue):

(1) Solvent: Butanol-acetic acid-water (4–1–5) (upper phase). Impregnation of the paper with the lower phase. Single spot of $R_f$ equal to that of insulin.
(2) Solvent: Secondary butanol-10% acetic acid (1—1). Single spot of $R_f$ equal to that of insulin.

As far as is known, this compound is not described in the literature.

EXAMPLE 6

Potassium salt of tris - $N^{A_1}, N^{B_1}, N^{\epsilon B_{29}}$ - (methyl-5-oxo-4-hexene-2 yl-2) [N$\delta$-(dimethyl-4,6 pyrimidinyl-2) ornithine $B_{22}$]-insulin in dissociated or slightly associated form, soluble in water; $I_B$, with $$Y=Z=R=CH_3$$

and

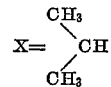

Stage A.—Tris - $N^{A_1}, N^{B_1}, N^{B_{29}}$ - (methyl - 5 oxo - 4 hexene-2 yl-2) [N$\delta$-(dimethyl-4,6 pyrimidinyl-2) ornithine $B_{22}$]-insulin in more or less strongly associated form, V, with Y=Z=R=$CH_3$ and

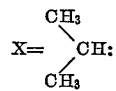

One introduces 0.3 g. of the hydrochloride obtained in Example No. 3, into a mixture of 1.5 g. of potassium bicarbonate, 9 cc. of water, 7.5 cc. of phenol, 6 cc. of 95° ethanol and 7.5 cc. of methyl-5-hexane dione-2,4, under agitation, in an inert atmosphere and at ambient temperature; one obtains a 2-phase solution and continues agitation for seven days at 25° C.; the pH (7.8) remains unchanged, one adds 10 volumes of acetone, centrifuges, washes the precipitate with acetone, then with ether and dries, with a current of nitrogen; one takes up the precipitate with 30 cc. of water, obtains an opalescent solution of pH=8.5–8.7 which one dialyses, for one night at 20° C., with 30 litres of demineralized water; the solution of pH=7.5–7.7 is filtered, lyophilized under 0.1 mm. of mercury, then one dries the residue in vacuo for one night; one obtains 226 mg. of tris-$N^{A_1}, N^{B_1}, N^{B_{29}}$-(methyl-5 oxo-4 hexene-2 yl-2) [N$\delta$ - (dimethyl - 4,6 pyrimidinyl-2) ornithine $B_{22}$]-insulin, in partially salified form, in the more or less strongly associated state.

Stage B.—Potassium salt of tris-$N^{A_1}, N^{B_1}, N^{\epsilon B_{29}}$-(methyl-5 oxo-4 hexene - 2yl - 2) [N$\delta$ - (dimethyl - 4,6 pyrimidinyl-2) ornithine $B_{22}$]-insulin in dissociated or slightly associated form, soluble in water: One dissolves 155 mg. of the product obtained in stage A of Example No. 6, in 10.3 cc. of a solution of phenol-water-N caustic potash (75–20–5) at pH=8, in an inert atmosphere and at 20° C. one adds 103 cc. of acetone, centrifuges the precipitate, washes it with acetone, then with ether and dries with a current of nitrogen, then in vacuo; one obtains 135 mg. of potassium salt of tris-$N^{A_1}, N^{B_1}, N^{B_{29}}$-(methyl-5 oxo-4 hexene-2 yl-2) [N$\delta$-(dimethyl-4,6 pyrimidinyl-2) ornithine $B_{22}$]-insulin in dissociated or slightly associated form, in the form of a colourless powder, soluble in water and physiological serum (yield: 87%).

*Analysis.* — $C_{280}H_{405}O_{78}N_{67}S_6K_6$=6356.5. Sulphuric ashes: 6.4% (theory for 6K: 8.24). Solvation: 5.1%.

U.V. spectrum (in aqueous solution NaCl 0.15 M NaOH 0.1 N quantity sufficient to have 0.003 N):

Infl. at about 237 m$\mu$ $E_{1\ cm.}^{1\%}$=89

Max. at 311 m$\mu$ $E_{1\ cm.}^{1\%}$=75

Circular dichroism:

(1) In aqueous solution NaCl 0.15 M:

$\Delta E_{1\ cm.}^{1\%} \times 10^3$ at 320 m$\mu$=−4.5 at 306 m$\mu$=−4.9 at 217 m$\mu$=−211 at 208 m$\mu$=−314 at 195 m$\mu$=+361

(2) In aqueous solution NaCl 0.15 M NaOH 0.1 N quantity sufficient to have 0.003 N:

$$\Delta E_{1\ cm.}^{1\%} \times 10^3 \text{ at } 320 \text{ m}\mu = -4.6$$
$$\text{at } 222 \text{ m}\mu = -179$$
$$\text{at } 208 \text{ m}\mu = -294$$
$$\text{at } 195 \text{ m}\mu = +681$$

Presence of the negative maximum at about 222 m$\mu$ showing the partially helicoidal configuration.

Chromatography on paper: Solvent: n-butanol-acetic acid-water (4–1–5). Upper phase. Impregnation of the paper with the lower phase. Solvent: secondary butanol-10% acetic acid (1–1). Revelation with bromophenol blue.

In the two cases, the product shows a single spot at the same $R_f$ as insulin.

As far as is known, this compound is not described in the literature.

EXAMPLE 7

Potassium salt of tris-$N^{A_1},N^{B_1},N^{\epsilon B_{20}}$-(oxo-3 cyclohexene-1 yl-1)[$N\delta$-(dimethyl - 4,6 pyrimidinyl - 2) ornithine $B_{22}$]-insulin in dissociated or slightly associated form, soluble in water, $I_B$, with X+Y=CH$_2$—CH$_2$—CH$_2$ and Z=R=CH$_3$ Stage A.—Tris-$N^{A_1},N^{B_1},N^{\epsilon B_{20}}$-(oxo-3 cyclohexene-1 yl-[$N\delta$-(dimethyl-4,6 pyrimidinyl-2) ornithine $B_{22}$]-insulin in the form of more or less strongly associated molecular aggregates, V, with X+Y=CH$_2$—CH$_2$—CH$_2$ and Z=R=CH$_3$: In a mixture formed of 16 cc. of a solution of 7% potassium bicarbonate and 2 cc. of 95% ethanol (pH of the solution: 6.1) one dissolves 2 g. of cyclohexane dione-1,3, one adds to this solution 0.2 g. of [$N\delta$-(dimethyl-4,6 pyrimidinyl-2) ornithine $B_{22}$]-insulin hydrochloride (obtained in Example No. 4) under agitation, one places under an inert atmosphere and agitates for five days at 25° C. One centrifuges the suspension for five minutes, washes the residue with water, then with acetone and finally with ether, dries with a current of nitrogen, then in vacuo. One obtains 177 mg. of tris-$N^{A_1},N^{B_1},N^{\epsilon B_{20}}$-(oxo-3 cyclohexene-1 yl-1([$N\delta$-(dimethyl-4,6 pyrimidinyl-2) ornithine $B_{22}$]-insulin in the form of more or less strongly associated molecular aggregates (yield: 84%).

Circular dichroism (in aqueous solution NaCl 0.15 M NaOH 0.003 N):

$$\Delta E_{1\ cm.}^{1\%} \times 10^3 \text{ at } 292 \text{ m}\mu = -3.8$$
$$\text{at } 215 \text{ m}\mu = -216$$
$$\text{at } 209 \text{ m}\mu = -383$$

Stage B.—Potassium salt of tris-$N^{A_1},N^{B_1},N^{\epsilon B_{20}}$-(oxo-3 cyclohexene-1 yl-1) [$N\delta$-(dimethyl-4,6 pyrimidinyl-2) ornithine $B_{22}$]-insulin in dissociated or slightly associated form, soluble in water: One dissolves in an inert atmosphere 140 mg. of the compound obtained above in 9.3 cc. of a solution of phenol-water-N caustic potash (75–20–5) at pH=8; at the end of three minutes, the dissolution is total; one then precipitates the insulin compound by the addition of 10 volumes of acetone, centrifuges, washes the residue with acetone, then with ether and dries with a current of inert gas, then in vacuo; one obtains 135 mg. of potassium salt of tris-$N^{A_1},N^{B_1},N^{\epsilon B_{20}}$-(oxo-3 cyclohexene-1 yl-1) [$N\delta$ - (dimethyl - 4,6 pyrimidinyl-2) ornithine $B_{22}$]-insulin in dissociated or slightly associated state, in the form of a white powder, soluble in water (yield: 96%).

Analysis. — $C_{277}H_{393}O_{78}N_{65}S_6K_6$=6308.44 Sulphuric ashes: 7.7–7.5% (theory: 8.3%).

Control of the blocking of the amino functions by N-dansylation: One causes dansyl chloride to act on 30 mg. of the compound obtained above and obtains 21 mg. of dansylated derivative; one hydrolyses 10 mg. of this derivative by heating to 100° C. with 1 cc. of 6 N hydrochloric acid for seventeen hours; one chromatographs the hydrolysate and elutes with the mixture methyl acetate-isopropyl alcohol-ammonia (45–35–20); one ascertains the absence of dansylated derivatives of glycine, of phenylalanine and of lysine; the blocking of the terminal amino groups is therefore complete.

Circular dichroism:

(1) In aqueous solution NaCl 0.15 M NaOH 0.1 N quantity sufficient to have 0.003 N:

$$\Delta E_{1\ cm.}^{1\%} \times 10^3 \text{ at } 220 \text{ m}\mu = -181$$
$$\text{at } 204-205 \text{ m}\mu = -358$$

(2) In aqueous solution HCl 0.1 N:

$$\Delta E_{1\ cm.}^{1\%} \times 10^3 \text{ at } 287 \text{ m}\mu = -11.6$$
$$\text{at } 221 \text{ m}\mu = -210$$
$$\text{at } 207 \text{ m}\mu = -280$$
$$\text{at } 195 \text{ m}\mu = +483$$

Presence of maximum of about 22 m$\mu$ characteristic of the helix form.

U.V. spectrum:

(1) HCl 0.1 N:

Infl. at about 223 m$\mu$ $E_{1\ cm.}^{1\%}$=123

Max. at 284 m$\mu$ $E_{1\ cm.}^{1\%}$=109

(2) In aqueous solution NaCl 0.15 M NaOH 0.1 N quantity sufficient to have 0.003 N:

Max. at 238 m$\mu$ $E_{1\ cm.}^{1\%}$=89

Max. at 289 m$\mu$ $E_{1\ cm.}^{1\%}$=136

Chromatography on paper: Solvent: secondary butanol-10% acetic acid (1–1). Impregnation of the paper with 10% acetic acid. Single spot of $R_1$ slightly lower than that of insulin.

As far as is known, this compound is not described in the literature.

DIAGRAM 1
(Reaction in homogeneous phase)

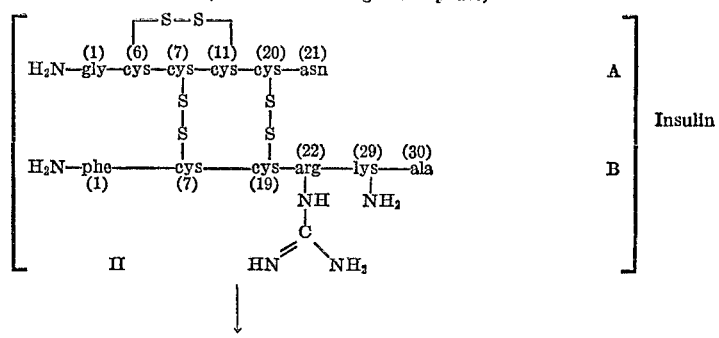

DIAGRAM 1—Continued

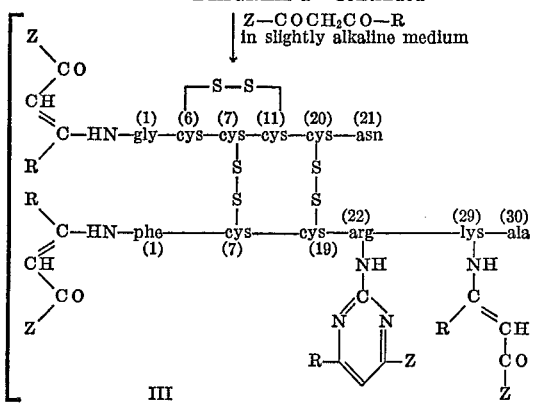

A — Alkali-metal salt strongly associated molecular aggregates, insoluble in water between pH=1 and pH=10

B

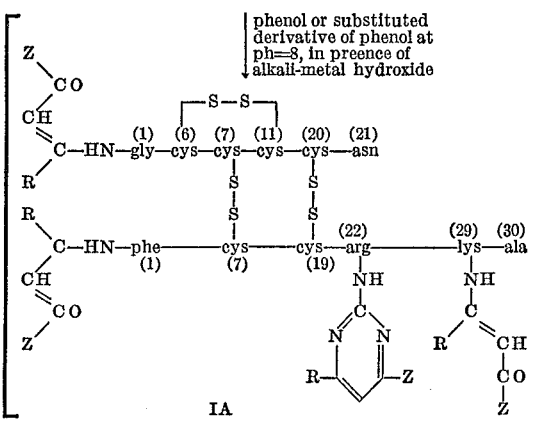

A — Alkali-metal salt in the dissociated or slightly associated state, soluble in water

B

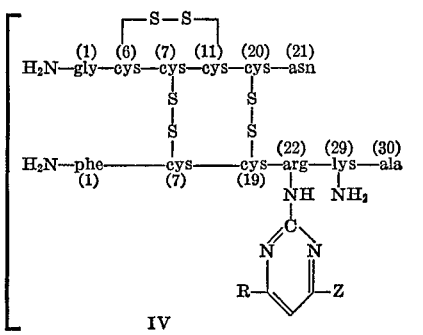

A — Salt of acid existing in the dissociated or slightly associated state, soluble in water

B

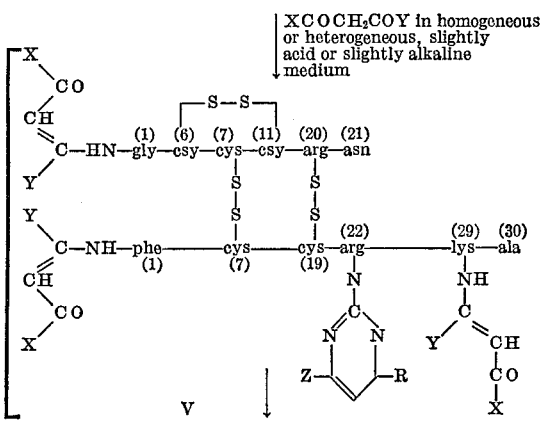

A — In the more or less strongly associated state and existing in the form of salt or free protein according to the reaction or isolation pH

B

DIAGRAM 1—Continued
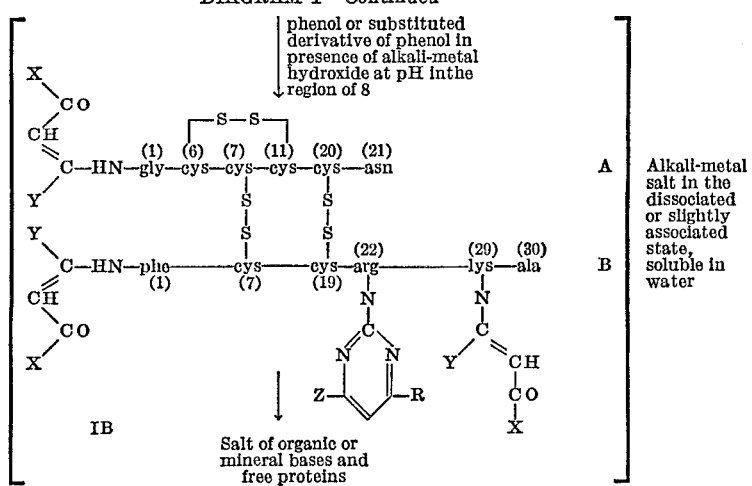
DIAGRAM 2
(Reaction in heterogeneous phase)
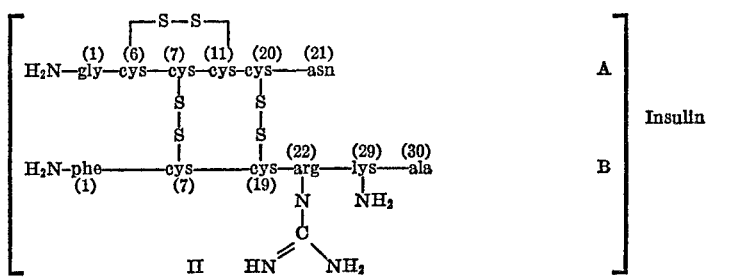
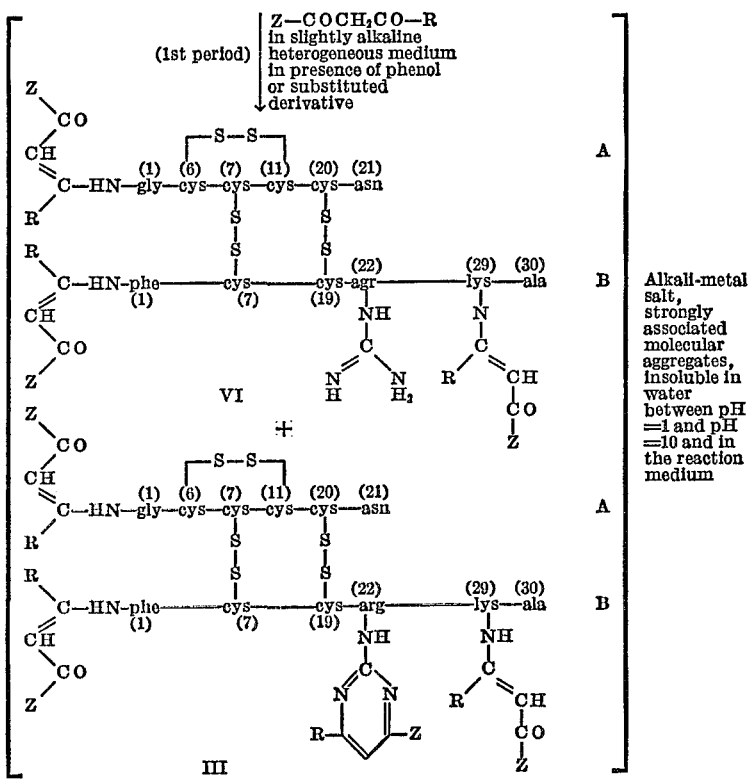

DIAGRAM 2—Continued

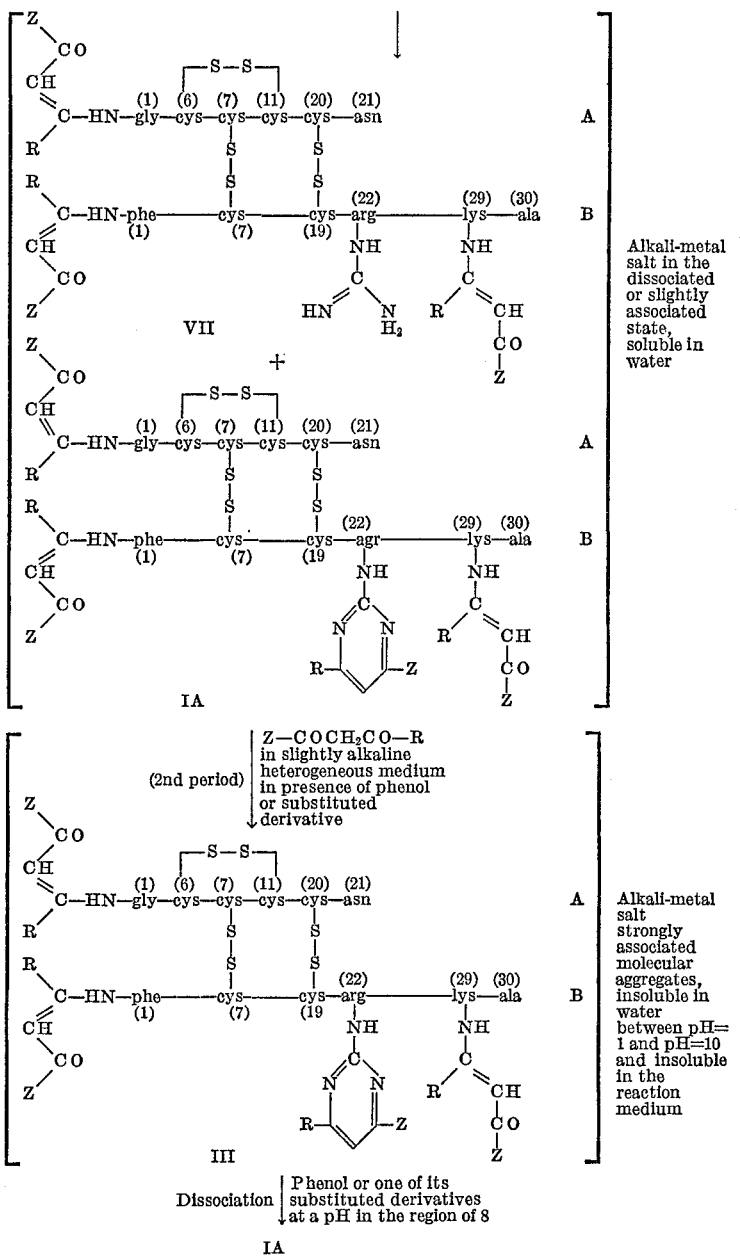

We claim:
1. A compound selected from the group consisting of a tris - $N^{A_1}, N^{B_1}, N^{\epsilon B_{29}}$-(3-X-3-oxo-1-Y-prop-1-en-1-yl) [$N\delta$-(4-Z-6-R-pyrimidin-2-yl) ornithine $B_{22}$]-insulin compound wherein X, Y, Z and R are individually alkyl of 1 to 6 carbon atoms, and X and Y together represent a member of the group consisting of dimethylene and trimethylene and water-soluble alkali metal salts thereof, said insulin compound being substantially free of highly associated molecular aggregates as shown by a negative maximum of about 220 m$\mu$ in its circular dichroism curve.
2. A compound of claim 1 selected from the group consisting of a tris-$A_1, N^{B_1}, N^{\epsilon B_{29}}$-(4-oxo-pent-2-en-2-yl) [$N\delta$-(4,6-dimethyl pyrimidin-2-yl)ornithine $B_{22}$]-insulin compound and alkali-metal salts thereof, said insulin compound being substantially free of highly-associated molecular aggregates.
3. A compound of claim 1 selected from the group consisting of a tris-$N^{A_1}, N^{B_1}, N^{\epsilon B_{29}}$-(5-methyl-4-oxo-hex-2-en-2-yl) [$N\delta$-4,6-dimethyl-pyrimidin-2-yl) ornithine $B_{22}$]- insulin compound and alkali-metal salts thereof, said insulin compound being substantially free of highly-associated molecular aggregates.
4. A compound of claim 1 selected from the group consisting of a tris-$N^{A_1}, N^{B_1}, N^{\epsilon B_{29}}$-(3-oxo-cyclohex-1-en-1-yl) [$N\delta$-(4,6-dimethyl-pyridimin-2-yl) ornithine $B_{22}$]-insulin compound and alkali-metal salts thereof, said insulin compound being substantially free of highly-associated molecular aggregates.
5. A process for the preparation of alkali metal salt of an insulin compound of claim 1 comprising reacting a compound selected from the group consisting of a tris-$N^{A_1}, N^{B_1}, N^{\epsilon B_{29}}$ - (3-X-3-oxo-1-Y-prop-1-en-1-yl) [$N\delta$-(4-Z-6-R-pyrimidin-2-yl) ornithine $B_{22}$]-insulin compound in the form of highly-associated molecular aggregates and an alkali-metal salt thereof with phenol in the presence of an alkali-metal hydroxide in an amount sufficient to obtain a pH of about 8, and isolating the resulting alkali metal salt.
6. The process of claim 5 wherein the said alkali-metal salt is treated with an acid to form the corresponding non-salified insulin compound.

7. A process for the preparation of an alkali-metal salt of a tris - $N^{A_1},N^{B_1},N^{\epsilon B_{29}}$-(3-Z-3-oxo-1-R-prop-1-en-1-yl) [Nδ-(4-Z-6-R-pyrimidin-2-yl) ornithine $B_{22}$]-insulin compound of claim 1 wherein Z and R are individually alkyl of 1 to 6 carbon atoms, said insulin compound being substantially free of highly associated molecular aggregates, comprising reacting insulin in a two-phase mixture of water and phenol at a pH greater than 7 and lower than the pH at which alteration of insulin begins to occur, with a β-diketone of the formula Z—CO—CH$_2$—CO—R$_1$ isolating the resulting mixture of an alkali metal salt of tris - $N^{A_1},N^{B_1},N^{\epsilon B_{29}}$-(3-Z-3-oxo-1-R-prop-1-en-1-yl)insulin and of an alkali-metal salt of tris-$N^{A_1},N^{B_1},N^{\epsilon B_{29}}$-(3-Z-3-oxo-1-R-prop-1-en-1-yl)[Nδ-(4-Z-6-R-pyrimidin - 2 - yl) ornithine $B_{22}$]-insulin, treating said mixture with phenol at a pH of about 8 to obtain a mixture of the two latter compounds substantially free of highly-associated molecular aggregates, reacting again the said mixture with the β-diketone Z—CO—CH$_2$—CO—R, and then with phenol under the same conditions as before and isolating the resulting alkali-metal salt.

8. The process of claim 7 wherein the said alkali metal salt is reacted with an acid to form the non-salified insulin compound.

9. A process for the preparation of a salt of [Nδ-(4-Z-6-R-pyrimidin-2-yl) ornithine $B_{22}$]-insulin, substantially free of highly-associated molecular aggregates, wherein Z and R are individually alkyl of 1 to 6 carbon atoms, comprising reacting an alkali-metal salt of a tris-$N^{A_1},N^{B_1},N^{\epsilon B_{29}}$ - (3-Z-3-oxo-1-R-prop-1-en-1-yl) [Nδ-(4-Z-6-R-pyrimidin-2-yl) ornithine $B_{22}$]-insulin compound, in the form of highly-associated molecular aggregates, with and aqueous solution of an acid in the presence of phenol and isolating the resulting compound.

References Cited

UNITED STATES PATENTS

| | | | |
|---|---|---|---|
| 3,471,464 | 10/1969 | Bellet et al. | 260—112.7 |
| 2,161,198 | 6/1939 | Reiner | 424—178 |
| 2,538,018 | 1/1951 | Krayenbuhl et al. | 424—178 |
| 3,481,917 | 12/1969 | Grant et al. | 260—112.7 |
| 3,528,960 | 9/1970 | Haas | 260—112.7 |
| 3,584,121 | 6/1971 | Krayenbuhl et al. | 424—178 |

OTHER REFERENCES

Waugh et al., J. Amer. Chem. Soc. 75, 2592–2600 (1953).

ELBERT L. ROBERTS, Primary Examiner

U.S. Cl. X.R.

424—178

UNITED STATES PATENT OFFICE
CERTIFICATE OF CORRECTION

Patent No. 3,752,798    Dated August 14, 1973

Inventor(s) Gaston Amiard et al.

It is certified that error appears in the above-identified patent and that said Letters Patent are hereby corrected as shown below:

Column 1, after line 8, insert -- Claims priority applications French PV 177.227 filed Dec. 9, 1968 and PV 183.273 filed Mar. 7, 1969 --. Column 1, after line 8, insert -- Assignor to: Roussel Uclaf, Paris, France --. Column 4, line 47, "sseveral" should read -- several --; line 60, "perceptable" should read -- perceptible --. Column 5, line 55, "200-25° C." should read -- 20° - 25° C. --. Column 7, line 24, "ornthine" should read -- ornithine --. Column 8, line 33, after "form" insert -- soluble in water, IV. --. Column 9, line 17, before "one" insert -- pH in --. line 21, "Z13" should read -- Z-3 --. Column 14, line 14, cancel "NaCl 0.15", first occurrence. Column 18, line 59, "$N_{67}$" should read -- $N_{65}$ --. Column 20, line 38, "22m " should read -- 222 m --; line 53, "$R_1$" should read -- $R_f$ --. Column 21, Diagram 1, Formula 3, last column, "inoluble" should read -- insoluble --; Column 21, Diagram Formula IA, "preence" should read -- presence --; Column 21, Formula V, "$(20)_{arg}$" should read -- $(20)_{cys}$ --. Column 23, Diagram 2, Formual VI, "$(22)_{agr}$" should read -- $(22)_{arg}$ --; Diagram 2, Formula III, "or of its" should read -- or one of its --. Column 25, Diagram 2, Formula IA "$(22)_{agr}$" should read -- $(22)_{arg}$ --; Diagram 2, Formula IA "(19" should read -- (19) --; Formula III, "(19" should read -- (19) --.

Signed and sealed this 27th day of August 1974.

(SEAL)
Attest:

McCOY M. GIBSON, JR.
Attesting Officer

C. MARSHALL DANN
Commissioner of Patents